Nov. 29, 1932.  D. SCHON  1,889,703
RADIATOR SHUTTER OPERATOR
Filed March 12, 1930  3 Sheets-Sheet 1
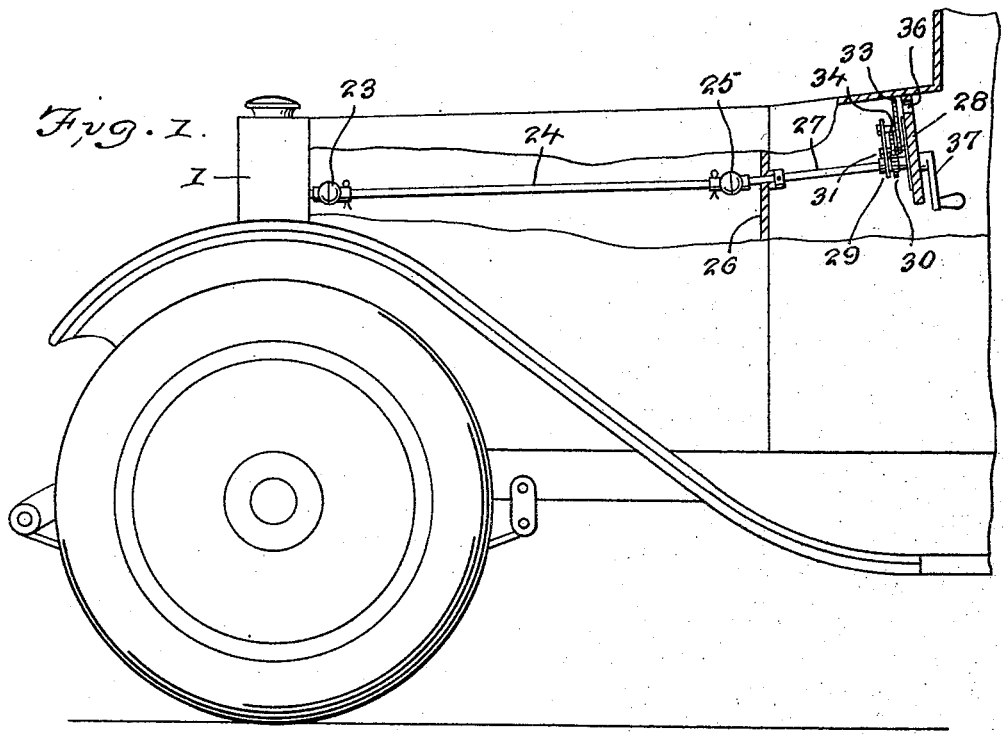
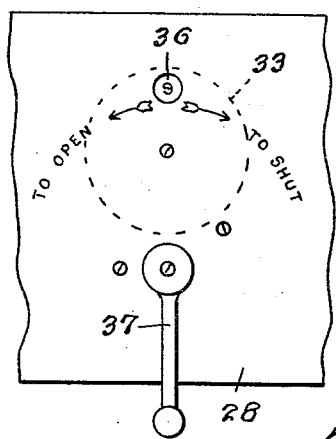
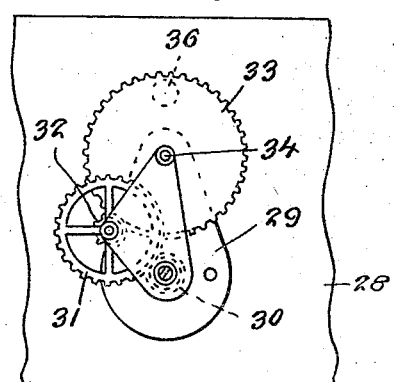
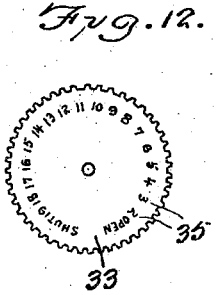
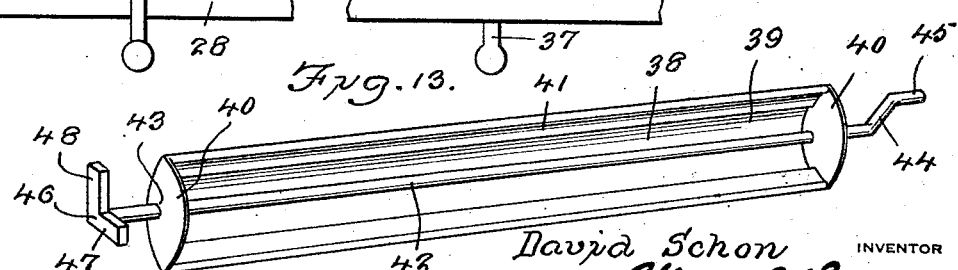
David Schon INVENTOR
BY Victor J. Evans ATTORNEY Nov. 29, 1932.  D. SCHON  1,889,703
RADIATOR SHUTTER OPERATOR
Filed March 12, 1930   3 Sheets-Sheet 2
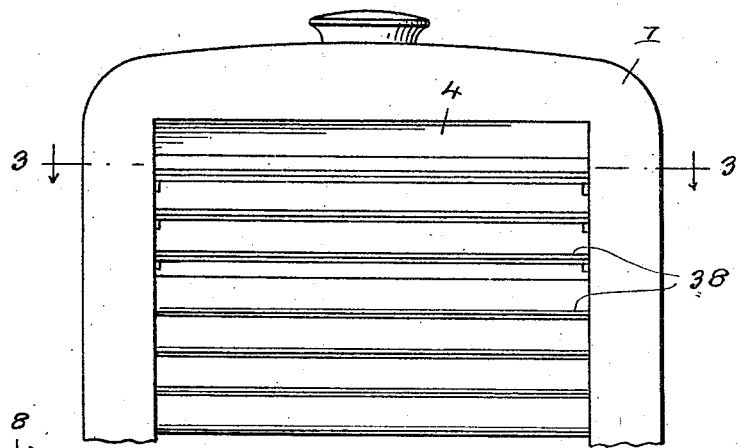
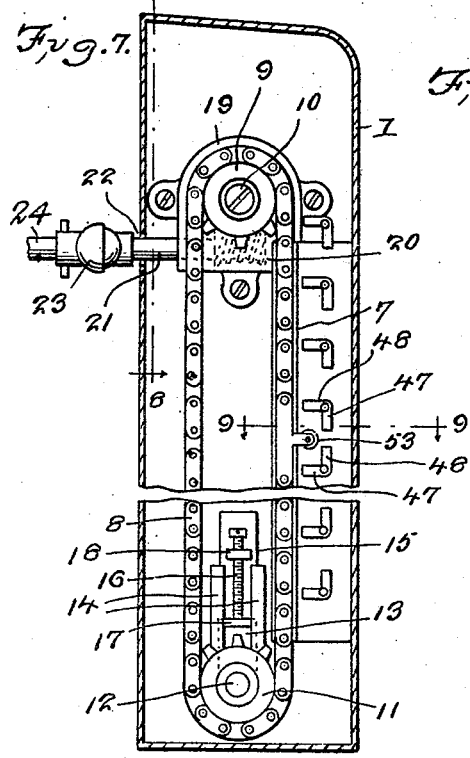
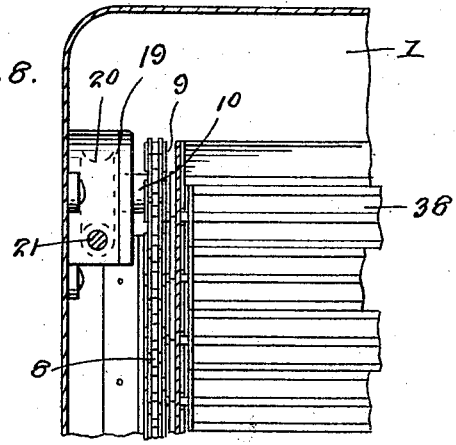
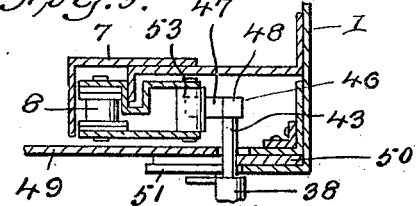
David Schon INVENTOR
BY Victor J. Evans ATTORNEY

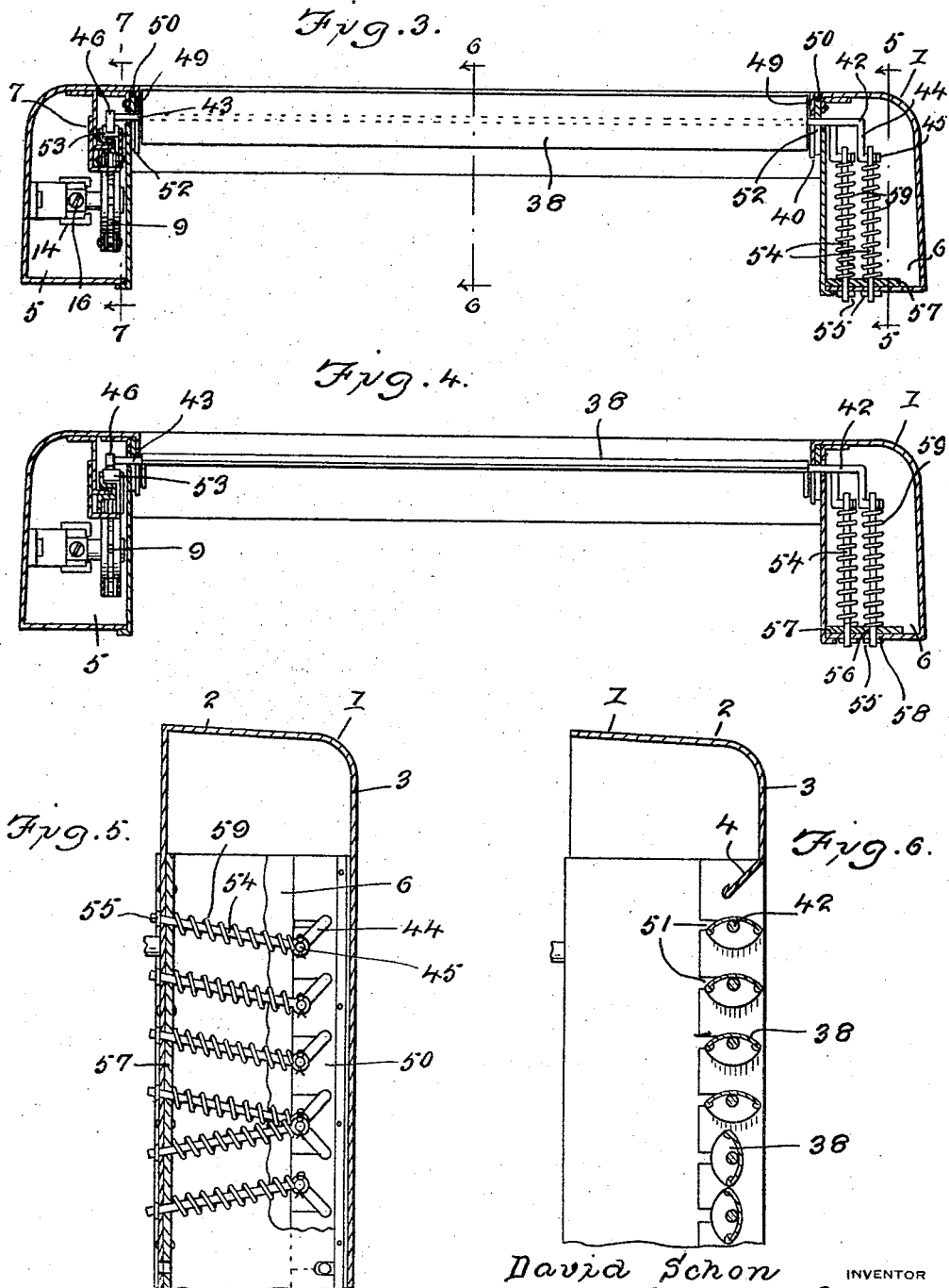

Patented Nov. 29, 1932

1,889,703

UNITED STATES PATENT OFFICE

DAVID SCHON, OF RED OAK, IOWA

RADIATOR SHUTTER OPERATOR

Application filed March 12, 1930. Serial No. 435,240.

This invention relates to an improvement in automobile radiator hoods and more particularly to an improvement in the shutter type of such devices. While hoods have been devised embodying shutters, means has ordinarily been provided for simultaneously adjusting all of the shutters to opened or closed position. Such devices however are not satisfactory for the reason that the water in an automobile radiator will freeze first at the bottom of the radiator. Therefore the present invention has as its primary object to provide a radiator hood embodying shutters and means actuating with the shutters and operable to effect successive closing of the shutters throughout the series from the lowermost shutter to the uppermost shutter, so that the lower portion of the radiator may be protected from cold air currents in this portion thereof.

The invention has as a further object to provide an extremely simple operating means for effecting successive closing or opening of the shutters so that any desired number of the shutters either at the top or bottom of the series may be opened or closed.

Another object of the invention is to provide a device of this class which may be controlled from the instrument board of the automobile thereby obviating the necessity of arresting the motion of the automobile or the driver leaving his seat to operate an adjusting means located at the radiator.

Another object of the invention is to provide, in connection with the actuating member of the device, an indicator means for indicating to the driver the precise number of shutter slats which have been opened or closed in the rotation of the member in one direction or the other.

This invention also consists in certain other features of construction and in the combination and arrangement of the several parts, to be hereinafter fully described, illustrated in the accompanying drawings, and specifically pointed out in the appended claim, it being understood that minor changes may be made so long as they fall within the scope of the claim.

In describing my invention in detail, reference will be had to the accompanying drawings, wherein like characters denote like or corresponding parts throughout the several views, and in which:—

Figure 1 is a view in side elevation illustrating a portion of the operating means for the shutter slats of the device, and the manner in which the means is mounted upon an automobile.

Figure 2 is a view in front elevation of the hood embodying the invention.

Figure 3 is a horizontal sectional view taken substantially on the line 3—3 of Figure 2, looking in the direction indicated by the arrows, the shutter slats shown in this figure being in open position.

Figure 4 is a view similar to Figure 3 illustrating the shutter slats in closed position.

Figure 5 is a vertical front to rear sectional view taken substantially on the line 5—5 of Figure 3, looking in the direction indicated by the arrows.

Figure 6 is a similar view on the line 6—6 of Figure 3.

Figure 7 is a similar view on the line 7—7 of Figure 3.

Figure 8 is a vertical transverse sectional view taken substantially on the line 8—8 of Figure 7 looking in the direction indicated by the arrows.

Figure 9 is a horizontal sectional view taken substantially on the line 9—9 of Figure 7 looking in the direction indicated by the arrows.

Figure 10 is a fragmentary view in front elevation of a portion of the instrument board of an automobile, illustrating the actuating member of the device of the invention, and also illustrating the indicating means.

Figure 11 is a rear elevation similar to Figure 10, illustrating the gearing which is actuated by rotation of the actuating member shown in Figure 10.

Figure 12 is a view in elevation of the indicator disk constituting a part of the indicator means.

Figure 13 is a perspective view in detail of one of the shutter slats.

The device embodying the invention includes a hood which is indicated in general by the numeral 1 and which is formed of sheet metal and which is adapted to take the place of the ordinary radiator hood of an automobile and the said hood houses, in addition to the shutter devices of the invention, the usual water circulating system of the ordinary radiator and includes a top portion which is indicated by the numeral 2 and which is open at its rear side and provided at its forward side with a downturned portion 3 and an inwardly extending portion 4 extending longitudinally of the lower edge of the portion 3, the portions 2 and 3 being designed to respectively seat upon the top of the ordinary hood and the front of the hood, and the portion 4 extending into the space defined by the side members and top member of the hood 1. The side members of the hood 1 are formed so as to provide, at one side of the hood, embodying the invention, a housing 5 and, at the other side, a housing indicated by the numeral 6, these housings extending downwardly at the opposite sides of the hood. By reference to Figures 3, 4, 7 and 9 of the drawings it will be observed that, within the compartment 5 there is provided an auxiliary housing indicated by the numeral 7 which is also of sheet metal and which houses one stretch of an endless sprocket chain which is indicated by the numeral 8.

This chain is trained about an upper sprocket 9 which is rotatably mounted upon a stub shaft 10, and the lower portion of the chain passes about a similar sprocket gear 11 rotatably mounted upon the stub shaft 12, this shaft being supported upon a bearing plate 13 mounted in guides 14, these guides being carried by a plate 15 welded or otherwise secured to the said outer side wall of the compartment 5, and a threaded stem 16 is swiveled at its lower end in an ear 17 which projects inwardly from the upper end of the bearing plate 13 and this stem is adjustably threaded through an ear 18 which is provided upon the plate 15, it being understood that by adjusting the said threaded stem, the tension of the sprocket chain 8 may be varied, as desired.

A housing 19 is also arranged within the compartment 5 near the upper end thereof and secured to the wall of the compartment and houses the sprocket gear 9 and shaft 10, and this housing 19 also houses a worm gear, which is indicated by the numeral 20 and which is fixed for rotation with the sprocket gear 9. A worm shaft 21 is mounted in the lower portion of the housing 19 and meshes with the gear 20 and this shaft extends through an opening 22 formed in the rear wall of the compartment 5. A universal joint 23 has one of its members mounted upon this end of the shaft 21 and its other member connected to a rod 24 which leads to and is connected with one member of another universal joint 25 which is preferably located immediately in front of the dash 26 of the automobile body. The other member of the universal joint 25 is connected to the forward end of a shaft 27 and this shaft is led at its forward end through an opening formed in the instrument board 28 of the automobile.

The numeral 29 indicates a bearing plate which is mounted upon the forward side of the instrument board 28, and mounted upon the shaft 27, between the instrument board and this bearing plate, is a pinion 30 which meshes with a gear 31, likewise mounted between the said plate and instrument board. A pinion 32 is rotatable with the gear 31 and meshes with a gear 33 which is mounted upon a shaft 34, this gear being located immediately in front of the instrument board and being provided upon its face which is presented to the board with an approximately annular series of index ordinals, indicated by the numeral 35 and ranging from "2 to 19", the number of index ordinals in this series corresponding to the number of shutter slats, and adjacent the ordinal "2", there is preferably the word "Open" and, in proximity to the index ordinal "19" there is the word "Shut". The index ordinals and the words "Open" and "Shut", are as stated arranged in an annular series and, in the rotation of the gear 33 they will pass, successively, behind an opening 36 which is formed in the instrument board. A crank handle 37 is fixed upon the rear end of the shaft 27 and constitutes a means whereby the shaft may be rotated to impart, thru the medium of the universal joint and the shaft 24, rotary motion to the shaft 21 and thus impart travel to the chain 8 thru the medium of the sprocket gears 9 and 11, and it will be understood at this point that the driver of the automobile, by rotating the crank handle may determine at a glance, the number of shutters which are in opened or closed position, by the index ordinal appearing thru the opening 36, and may likewise determine when all of the shutters are opened or closed by rotating the crank handle 37 until the index words appear before the opening 36.

The slats of the attachment are of sheet metal and one of the slats is clearly shown in detail in Figure 13 of the drawings and this slat, which is indicated in general by the numeral 38, comprises an arcuate plate 39 provided at each end with a head 40 which is of substantially elliptical form and the marginal portions of each slat are preferably overturned in an inward direction against the concave side of the slat as indicated by the numeral 41. A rod 42 is fitted thru and secured in openings 43 formed in the heads 40 and at one end, the rod 42 is bent to provide a crank portion 44 which extends at right angles thereto and this crank portion terminates in a right angular laterally extending portion 45 which serves a purpose to be presently explained. Upon the opposite end of each rod there is mounted an abutment element indicated in general by the numeral 46 and comprising right angularly extending arms indicated one by the numeral 47 and the other by the numeral 48.

In mounting the slats 38, an oblong plate 49 is mounted parallel to the inner wall of each of the housings 5 and 6, and a strip 50 of packing material is arranged between each of the said inner side walls and the plates 49, and each of these plates is formed with a series of notches 51 extending inwardly from the rear edge of the plate and, as clearly shown in Figures 3, 4 and 9 of the drawings, the ends of the rods 42 are fitted in these notches, the inner side walls of the housings 5 and 6 being formed with openings 52 in which the ends of the rod 42, at their portions which extend beyond the heads 40 of the slats, are rotatably mounted and that end of each rod 42 which carries the abutment element 46 extends into the auxiliary housing 7 and, when the slats are in closed position as shown in Figure 4 of the drawings, the arms 47 of the abutment element 46 will extend horizontally and rearwardly and the arms 48 will extend vertically at any desired point in the endless chain 8, and a roller 53 is mounted upon the outer side of the chain and it will be observed by reference to Figure 7 of the drawings that in either the downward or upward movement of the stretch of the chain upon which this roller is mounted, such of the arms 47 and 48, of the slats, are in the path of movement of the roller. Therefore, as the chain travels in one direction or another, depending upon the direction of rotation of the actuating crank handle 37, the roller 53 will travel either upwardly or downwardly, and as it passes such of the arms 47 as are in horizontal position, the rods upon which these arms are supported will be rotated so as to rotatably adjust the respective slat 38 to a substantially horizontal position and, on the other hand, when any one of the arms 48 is engaged by the roller, the rod 42 of the respective slat will be swung upwardly and the slat will be rotatably adjusted to a vertical or closed position. It will be understood, from the foregoing, that by rotating the crank handle 37 toward the left, assuming that all of the shutters are in closed position, the endless chain 8 will be caused to travel in such direction that the roller 53 will successively engage the arms 47 of the abutment element 46 of the shutter slats throughout the series from the lowermost slat to the uppermost slat, or from the lowermost slat to any desired successively elevated ones of the slats of the series to provide for the free admission of air currents through the lower portion of the shutter and, on the other hand, when the crank handle 37 is rotated in the opposite direction and the roller 53 is at the upper limit of its movement, the arms 48 of the abutment elements 46 upon the slats from the uppermost to the lowermost slat, will be engaged in succession and all of the slats or any desired number thereof, in the series, will be adjusted to closed position.

It will be evident, at this point, that due to the arrangement and combination of parts above described, the slats may be selectively adjusted so as to provide for the passage of air to the radiator to maintain the radiator at the proper degree of temperature both to prevent freezing and overheating.

In order that the slats of the shutter may be yieldably held in both opened and closed position, stems 54 are pivotally connected at their inner end to the terminals 45 of the slat supporting rods 42 and are slidably fitted at their outer ends through openings 55 and 56 formed respectively in the rear wall of the housing 6 and in a packing strip 57 which is arranged upon the inner side of this wall, cotter pins 58 being fitted thru the ends of the said stems 54 and engaging against the said wall of the said housing 6, and a compression spring 59 being arranged upon each stem 54 and bearing at one end against the eye at the inner end of the stem by which the stem is connected with the terminal portion 45 of the rod 42 and at its other end against the said strip 57, the arms 44 of all of the rods 42 being in this manner held in a position of angular adjustment to either maintain the respective slot in opened or in closed position.

It will be understood of course that the packing strips 49 and 57 being of some yieldable or elastic material, will serve to prevent rattling of the moving parts of the shutter attachment.

It will be understood that the water circulating system of the radiator will be installed within the hood in the manner found most convenient and it is for this reason that the component parts of such a system have not been shown in the drawings.

What I claim is:—

A shutter operating means comprising spaced compartments, a series of shafts journaled in the compartments and bridging the space between them, a shutter carried by each shaft, each shaft having at one end a single crank arm housed in one compartment and at its other end a double crank arm housed in the other compartment, an endless chain mounted for movement in one compartment and having a projection adapted to engage the double crank arms successively to turn the shafts and spring means connected with the single crank arms and adapted to hold the shafts at positions at which they are turned.

In testimony whereof I affix my signature.

DAVID SCHON.